Fig 3 is a view of a center piece with tube attached to convey the heated air from the back fire plate into the center piece Fig 4. is a view of a center piece with lateral openings for bringing the air thro the side plates directly into the center plate (x x)

Fig 5 air enters front.

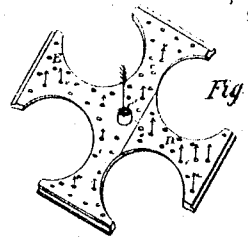

Fig 3

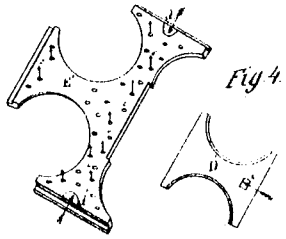

Fig 4

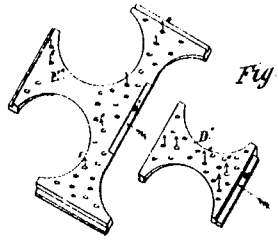

Fig 5

Fig. 1

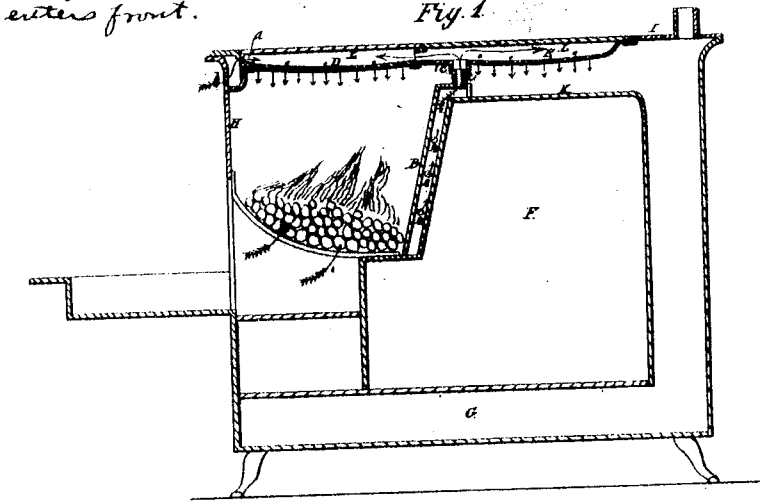

Fig. 2

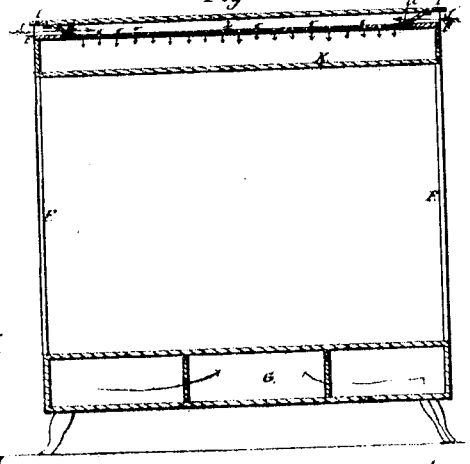

In Fig 1 air enters side plates F thro openings A. A, passes along fire plate B up the connecting tube C into the center plates E + D, thence escaping thro numerous small openings o, o, o, in the ends side of the center plates Fig 3 is a view of the center piece in Fig 1 reversed.

Witnesses,

Inventor:

James Spear

J. Spear,

Cook Stove.

No. 22,5.

(Ill.) Patented Nov. 22. 1859.

BEST AVAILABLE COPY